Aug. 9, 1938.      P. B. STREANDER      2,126,228
ACTIVATED SLUDGE PURIFICATION OF SEWAGE AND OTHER LIQUIDS
Filed Aug. 27, 1936      2 Sheets-Sheet 1

INVENTOR
Philip B. Streander
BY
his ATTORNEY

Patented Aug. 9, 1938

2,126,228

UNITED STATES PATENT OFFICE 2,126,228

ACTIVATED SLUDGE PURIFICATION OF SEWAGE AND OTHER LIQUIDS

Philip B. Streander, Maplewood, N. J., assignor to Municipal Sanitary Service Corporation, New York, N. Y., a corporation of New York Application August 27, 1936, Serial No. 98,118

6 Claims. (Cl. 210—8)

The present invention relates to the purification of sewage and other impure liquids by the use of activated sludge. This purification is effected by the action of aerobic bacteria stimulated by aeration of the sewage which tends to keep the bacterial sludge well distributed and highly active and effective.

It is a general practice in activated sludge treatment of sewage to screen the sewage and remove the larger solids by settling before subjecting the sewage to aeration. The actual activated sludge treatment is usually carried out by use of an aeration tank and a finally settling plant receiving the effluent from the aeration tank. Preferably between 10 and 30 per cent of the activated sludge settling out in the final settling tank is returned to and mixed with sewage entering the aeration tank.

During the first stages of the aeration period the impurities in the sewage are rapidly coagulated and adsorbed by the activated or biologically active sludge, and the rate of coagulation and adsorption is proportional to the percentage of biologically active sludge in the sludge liquor. In the latter stages, purification proceeds at a much slower and uniform oxygenation of the mixing liquor. During this stage the presence of a large proportion of sludge retards the oxygenation of the sewage proper.

The principal objects of the present invention are to provide improved apparatus and methods for activated sludge purification of sewage and analogous liquids.

According to a preferred manner of carrying out the invention, the activated sludge treatment may be effected in a single tank and in such a manner that the heavy concentration of returned sludge is always at the influent end of the tank and available for the first stages of aeration. This condition is obtained by providing conveying means acting to carry the heavier sludge particles to the influent end of the tank and mix them with the incoming raw sewage.

The structure may be so arranged and the air so introduced as to produce a transverse or lateral movement of the liquid and even a rotating movement thereof. Also by varying the amount of air introduced at different points the rotation may be varied at different parts. For example there may be a higher rate of rotation at the influent end and a lower rate at the effluent end, thereby at last partially obtaining a selective graduation of the particles settling to the bottom of the tank. The transverse velocities with the preferred form of tank may be considerably lower than for the conventional type of tank, particularly in the latter half of the tank. The effluent from this type of aeration tank will consist of the lighter forms of activated sludge and may be disposed of in any suitable manner. Under certain conditions it may be desirable to collect smaller particles of activated sludge and convey them to the influent end of the tank.

Other objects, features and advantages will be apparent upon consideration of the following description and of the drawings in which.

Figure 1:
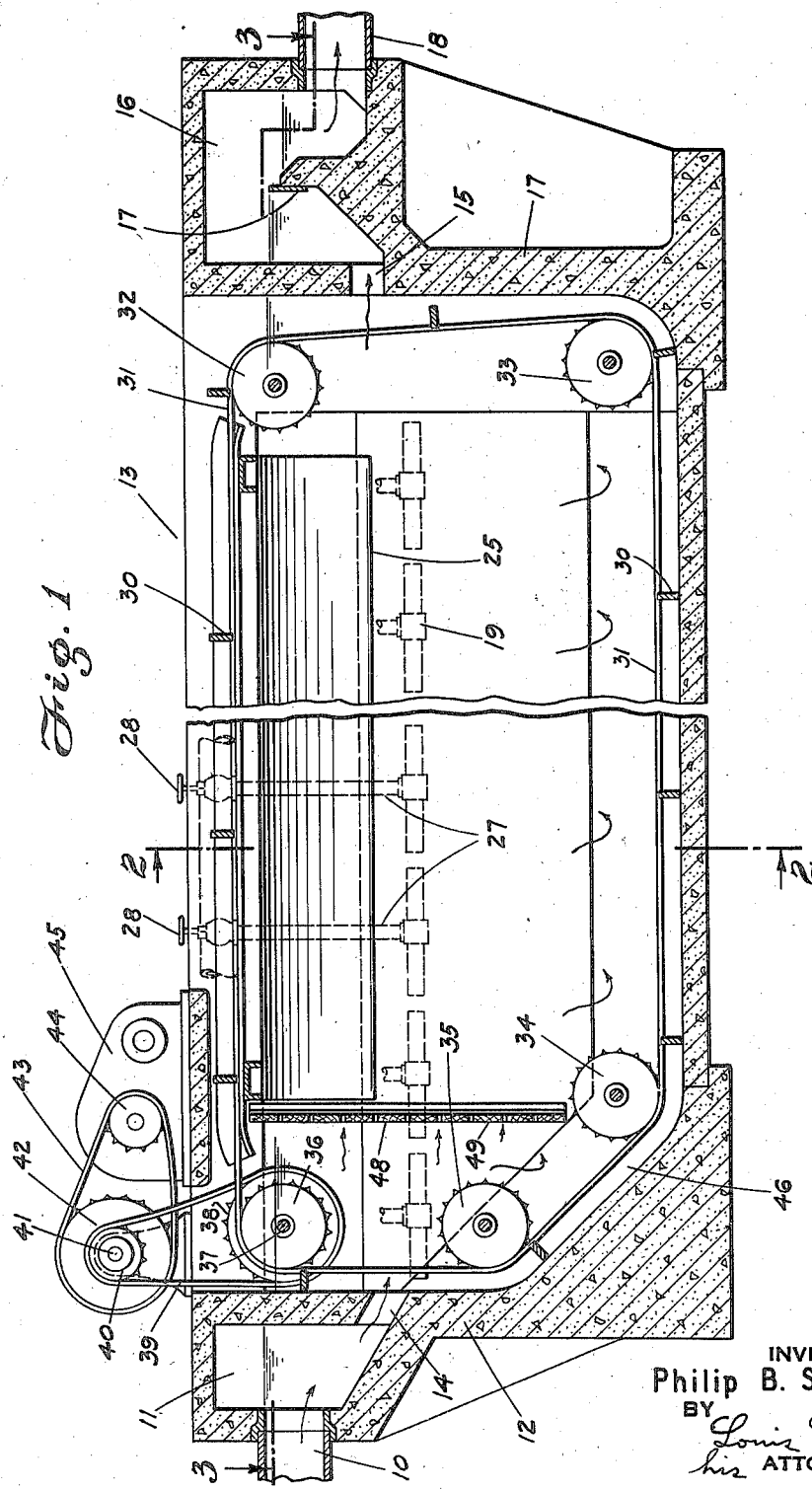
Fig. 1 is a vertical longitudinal section of one unit constituting a preferred embodiment of the invention.

Referring to the drawings, the liquid to be treated may be supplied through a conduit or pipe 10 to a distributing chamber 11 mounted on the end wall 12 of a tank 13. The distributing chamber 11 may have an inclined bottom directing the liquid through slots or openings 14 into the tank 13 substantially below the normal liquid level. After aeration in the tank 13 the effluent may pass out through outlets or slots 15 into a chamber 16 supported on the other end wall 17 of the tank. The chamber 13 may be provided with a weir 17 which determines the normal height of the liquid in the tank and over which the liquid flows for discharge into an effluent duct or conduit 18.

Aeration of the liquid passing through the tank 13 may be effected in different ways but preferably by means of air diffusers or suppliers 19 arranged along the side walls 20 and 21 of the tank in air-lift channels 22 between the walls 20 and 21 and upright baffles 23. It will be seen that the liquid passing upwardly through the air-lift channels tends to flow inwardly toward the middle of the tank and then downwardly to the lower part of the tank where it is again drawn beneath the baffles 23.

Figure 2:
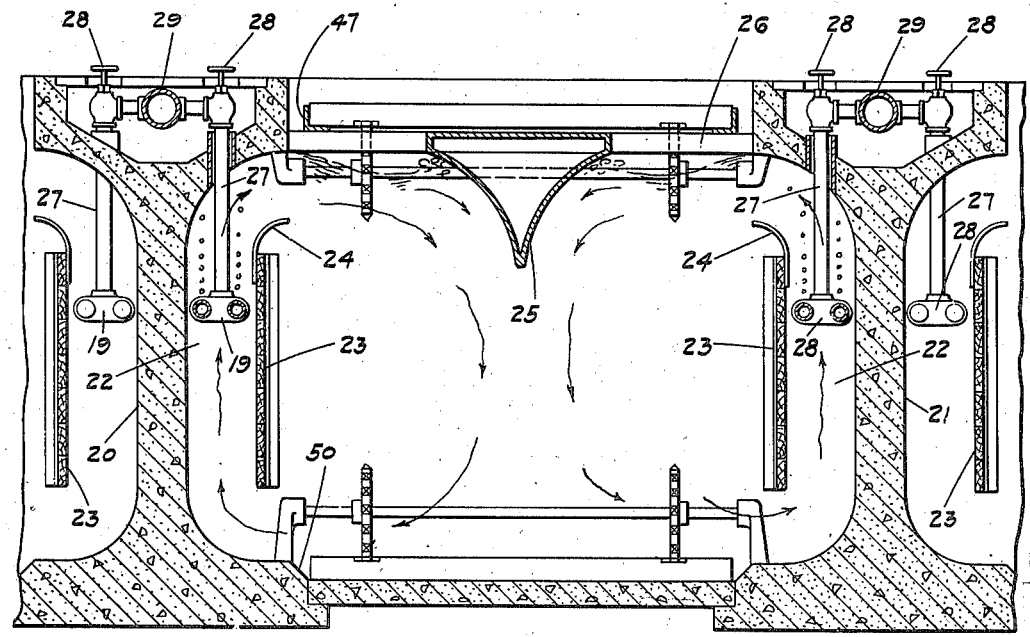
Fig. 2 is a section on the line 2—2 of Fig. 1.
Figure 3:
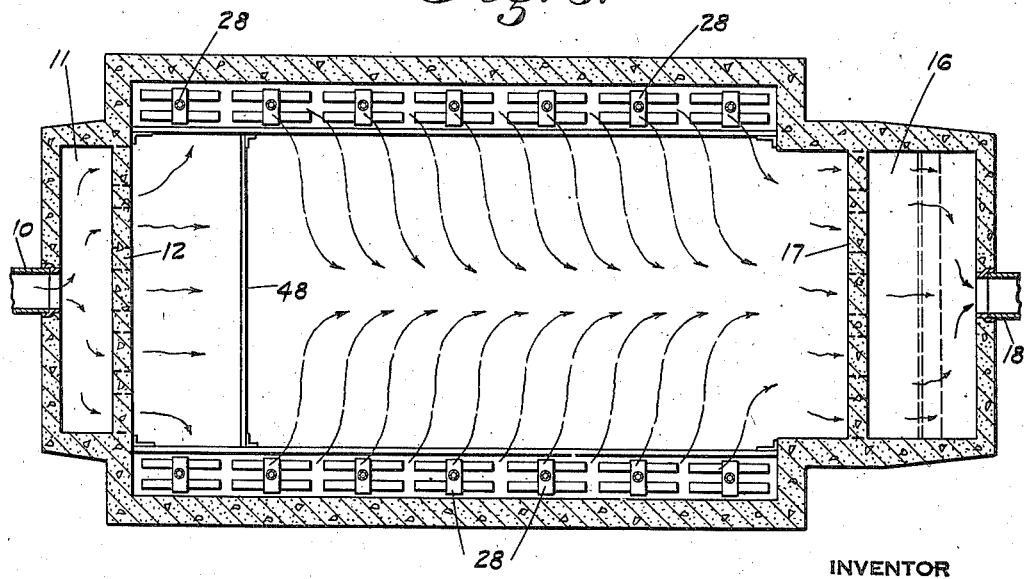
Fig. 3 is a section on the line 3—3 of Fig. 1.

To effect a smooth flow of the liquid the side walls and bottom of the tank may be connected in such a way as to provide curved deflecting surfaces, and the walls may be shaped near their tops so as to provide suitably curved deflecting surfaces to direct the liquid toward the middle of the tank. The control of the flow of liquid at the top of the tank may also be assisted by providing curved plates or deflectors 24 at the upper edges of the baffles 23. Proper circulation of the liquid may also be facilitated by a double deflector 25 located longitudinally and centrally of the tank in the upper part thereof and supported by suitable cross members 26 extending from one side of the tank to the other. Said deflector 25 is provided with curved deflecting surfaces at opposite sides to direct downwardly liquid passing from the sides of the tank and engaging the deflector. The air diffusers or suppliers 19 may be supported in pairs at the lower ends of vertical pipes 27 connected at their upper ends through valves 28 with air mains 29 preferably located immediately above the side walls of the tank. As illustrated in Figure 2 a plurality of tanks or units may be arranged side by side and each air main 29 may be used to supply air to air-lift channels on opposite sides of the wall of the tank.

According to the present invention the heavier particles of activated sludge settling at the bottom of the tank are conveyed in any suitable manner to the influent end of the tank and raised into position to mix with the influent sewage entering through the inlet 14. Preferably the settled sludge is carried to the influent end of the tank by a suitable conveyor such as an open work endless conveyor comprising scrapers 30 mounted on flexible members or belts 31 passing over sprockets 32 and 33 respectively, rotatably mounted at the top and bottom of the tank and at its effluent end. The belts 31 also pass around sprockets 34 rotatably mounted in the bottom of the tank near its influent end, sprockets 35 rotatably mounted at the influent end of the tank somewhat below the inlet 14 and positively driven sprockets 36 mounted at the top of the tank at the influent end at substantially the same level as sprockets 32 at the effluent end of the tank.

The sprockets 36 may be rigidly mounted on a shaft 37 which may be driven by means of a sprocket 38 fixed thereon and belt 39 connecting the sprocket 38 with the sprocket 40 mounted on a driving shaft 41, the driving shaft 41 being provided with a sprocket 42 which in turn is driven by a belt or chain 43 also passing around a sprocket 44 of driving mechanism 45. The arrangement of the sprockets is such that the scrapers 30 will carry settled sludge along the bottom of the tank toward the inlet end, up an incline 46 from the bottom of the tank to the front wall of the tank and then upwardly to the inlet 14. The upper reach of the endless conveyor may be supported by angles 47 receiving the ends of the scrapers 30.

The flow of the liquid through the tank may be controlled by a transverse partition 48 provided with slots 49.

Preferably the bottom of the tank is provided with a sump or depression 50 having a flat bottom to cooperate with the scrapers and having sides of such inclination as to restrain sidewise movement of the settled sludge with the liquid flowing outwardly to the lower portions of the air-lift channels.

In operation, the sewage to be treated flows through the inlet 14 into the tank 13 and due to the slotted partition 48 is thoroughly mixed with the activated sludge conveyed to the influent end of the tank by the scrapers 30. Consequently during the early stages of the aeration period, the impurities in the influent sewage are rapidly coagulated and adsorbed by the activated or biologically active sludge, the rate of coagulation and adsorption being proportional to the percentage of biologically active sludge in the sludge liquor. Due to the air diffusers in the air lift channels between the baffles 23 and the side walls of the tank, the material in the compartment set off by the partition 48 is drawn out under the inclined lower edges of the adjacent portions of the baffles 23 and, aided by the various deflecting surfaces, flows in two substantially helical paths to the effluent end of the tank. During this flow through the tank the heavier particles will tend to settle first and the lighter ones later. It will be evident that, by regulation of the valves 28 the rate of rotation flow may be varied in different parts of the tank. By gradually reducing the rate of rotation toward the effluent end of the tank, same selective graduation of the settled particles may be obtained.

It should be understood that various changes may be made and that various features may be used without others without departing from the true scope and spirit of the invention.

Having thus described my invention, I claim:

1. In a purification system, a tank having an inlet at one end wall and an outlet at the other end wall, aeration means acting on liquid passing through said tank, and means for moving all of the settled activated sludge back along the bottom of the tank to its inlet end and up the surface of the inlet end wall to the inlet for mixture with the influent liquid.

2. In a purification system, a tank having an inlet at one end and an outlet at the other end, means for aerating sludge passing through the tank, and means for moving settled activated sludge to the inlet end of the tank for mixture with the influent liquid, said sewage aerating means including air supplying devices at the sides of the tank to cause upward flow of the liquid adjacent said sides, and a deflecting device at the top of the tank and extending longitudinally and centrally thereof to direct downwardly the liquid flowing upwardly at the sides of the tank and inwardly at the upper surface of the liquid in the tank.

3. In a purification system, a tank having an inlet at one end and an outlet at the other end, means for aerating the liquid passing through the tank and causing circulation transversely of the flow of liquid through the tank, means for moving the settled activated sludge to the inlet end of the tank for mixture with the incoming sludge, such means for aerating and circulating the liquid including upright baffles adjacent to the sides of the tank but spaced therefrom, air supplying means between the baffles and the sides of the tank and a deflector extending longitudinally and centrally of the tank to turn downwardly liquid flowing thereto from the sides of the tank.

4. In a sewage purification system, a tank having an inlet at one end and an outlet at the other end, an upright baffle at each side of the tank and extending longitudinally thereof, aerating means including air supplying devices between the baffles and the corresponding sides of the tank to cause upward flow of the sewage adjacent said sides, the bottom of the tank being provided with a longitudinal sump with sides spaced inwardly from the sides of the tank to a somewhat greater extent than said baffles and serving to restrain activated sludge settled in said sump from being carried out of the same by liquid flowing toward the sides of the tank, and means for moving the settled activated sludge along said sump to the inlet end of the tank and up along the surface of said inlet end to said inlet for mixture with incoming sewage.

5. In a purification system, a tank having an inlet at one end, an outlet at the other end, a bottom with a flat-bottomed sump spaced from the sides of the tank and a curved extension of the sump leading up to the inlet, means for aerating the liquid passing through the tank and producing activated sludge which settles in said sump, and a conveyor with scrapers to move the activated sludge along said sump and up said curved extension to the inlet for mixing with the influent liquid.

6. In a purification system, a tank having an inlet at one end and an outlet at the other end, means for moving settled activated sludge along the bottom of the tank to the inlet end thereof for mixture with the influent liquid, two upright baffles extending longitudinally of the tank adjacent to the sides thereof, sewage aerating means including air supplying devices between the baffles and the sides of the tank to cause upward flow of the liquid adjacent said sides, and a transverse perforated partition near the influent end of the tank and extending across the space between the baffles to provide a mixing chamber in which the activated sludge and incoming sewage are brought together.

PHILIP B. STREANDER.